US006139886A

United States Patent [19]
Green et al.

[11] Patent Number: 6,139,886
[45] Date of Patent: Oct. 31, 2000

[54] R-T-E CEREALS WITH CALCIUM CONTAINING PRE-SWEETENER COATING AND METHOD OF PREPARATION

[75] Inventors: Daniel R. Green, Minnetonka; Steven J. Leusner, Orono; Donald J. Smith, Eden Prairie; Terence D. Stevens, St. Paul, all of Minn.

[73] Assignee: General Mills, Inc., Minneapolis, Minn.

[21] Appl. No.: 09/272,791

[22] Filed: Mar. 19, 1999

[51] Int. Cl.⁷ .............................. A23L 1/164; A23L 1/304
[52] U.S. Cl. .............................. 426/96; 426/74; 426/103; 426/302; 426/305; 426/443; 426/618; 426/619; 426/620; 426/621; 426/648; 118/13
[58] Field of Search ................................ 426/94, 96, 302, 426/305, 74, 103, 443, 619, 618, 620, 621, 648; 118/13

[56] References Cited

U.S. PATENT DOCUMENTS

| | | |
|---|---|---|
| 1,163,175 | 12/1915 | Bullman . |
| 2,098,544 | 11/1937 | Hill . |
| 2,166,797 | 7/1939 | Collatz . |
| 2,239,543 | 4/1941 | Andrews et al. . |
| 2,600,532 | 6/1952 | Hale et al. . |
| 2,707,153 | 4/1955 | Bettman . |
| 2,743,685 | 5/1956 | Hale et al. . |
| 2,788,277 | 4/1957 | Huber . |
| 3,557,718 | 1/1971 | Chivers . |
| 3,565,559 | 2/1971 | Sato et al. . |
| 3,615,676 | 10/1971 | McKown et al. . |
| 3,620,762 | 11/1971 | Yoshida et al. . |
| 3,622,344 | 11/1971 | Allingham . |
| 3,726,693 | 4/1973 | Harris . |
| 3,764,343 | 10/1973 | Paugh . |
| 3,814,822 | 6/1974 | Henthorn et al. . |
| 3,878,305 | 4/1975 | Damico et al. . |
| 3,952,115 | 4/1976 | Damico et al. . |
| 4,079,151 | 3/1978 | Schade et al. ............................. 426/96 |
| 4,089,984 | 5/1978 | Gilbertson . |
| 4,338,339 | 7/1982 | Edwards . |
| 4,378,377 | 3/1983 | Gajewski . |
| 4,497,840 | 2/1985 | Gould et al. . |
| 4,540,587 | 9/1985 | Gajewski . |
| 4,614,657 | 9/1986 | Sheng et al. . |
| 4,702,925 | 10/1987 | Verrico ..................................... 426/96 |
| 4,755,390 | 7/1988 | Calandro et al. . |
| 4,856,453 | 8/1989 | Verrico ..................................... 118/24 |
| 4,857,339 | 8/1989 | Maselli et al. . |
| 4,859,477 | 8/1989 | Augustine et al. . |
| 4,880,645 | 11/1989 | Carpenter et al. . |
| 4,988,521 | 1/1991 | Fan . |
| 5,005,514 | 4/1991 | Verrico ..................................... 118/16 |
| 5,023,024 | 6/1991 | Kyogoku et al. . |
| 5,093,146 | 3/1992 | Calandro et al. . |
| 5,258,187 | 11/1993 | Shimada . |
| 5,270,063 | 12/1993 | Wullschleger et al. . |
| 5,275,831 | 1/1994 | Smith et al. . |
| 5,306,519 | 4/1994 | Peterson et al. . |
| 5,449,523 | 9/1995 | Hansen et al. . |
| 5,510,130 | 4/1996 | Holtz et al. . |
| 5,516,541 | 5/1996 | Breslin et al. . |
| 5,631,034 | 5/1997 | Trumbetas et al. . |
| 5,645,878 | 7/1997 | Breslin et al. . |
| 5,695,805 | 12/1997 | Borek et al. . |
| 5,698,252 | 12/1997 | Kelly et al. . |
| 5,707,448 | 1/1998 | Cordera et al. . |
| 5,709,902 | 1/1998 | Bartolomei et al. . |
| 5,798,132 | 8/1998 | Chen et al. . |

FOREIGN PATENT DOCUMENTS 2079129A 1/1982 United Kingdom .

*Primary Examiner*—Milton Cano
*Attorney, Agent, or Firm*—John A. O'Toole; Douglas J. Taylor; Everett G. Diederiks

[57] ABSTRACT

A method for coating discrete food pieces with a sweet coating such as in the preparation of a presweetened R-T-E cereal and coated food products prepared by the process. The coating resists dissolution in cold milk. The coating contains a mixture of sugars, gelatin and calcium material. The method of preparation comprises the steps, in sequence of: (A) providing a base of dried food pieces; (B) blending an aqueous sugars solution with an aqueous gelatin solution and calcium material; (C) coating the base of dried food pieces with the aqueous sugar, gelatin solution and calcium material; and (D) drying the coated product to a shelf stable moisture content.

18 Claims, 1 Drawing Sheet

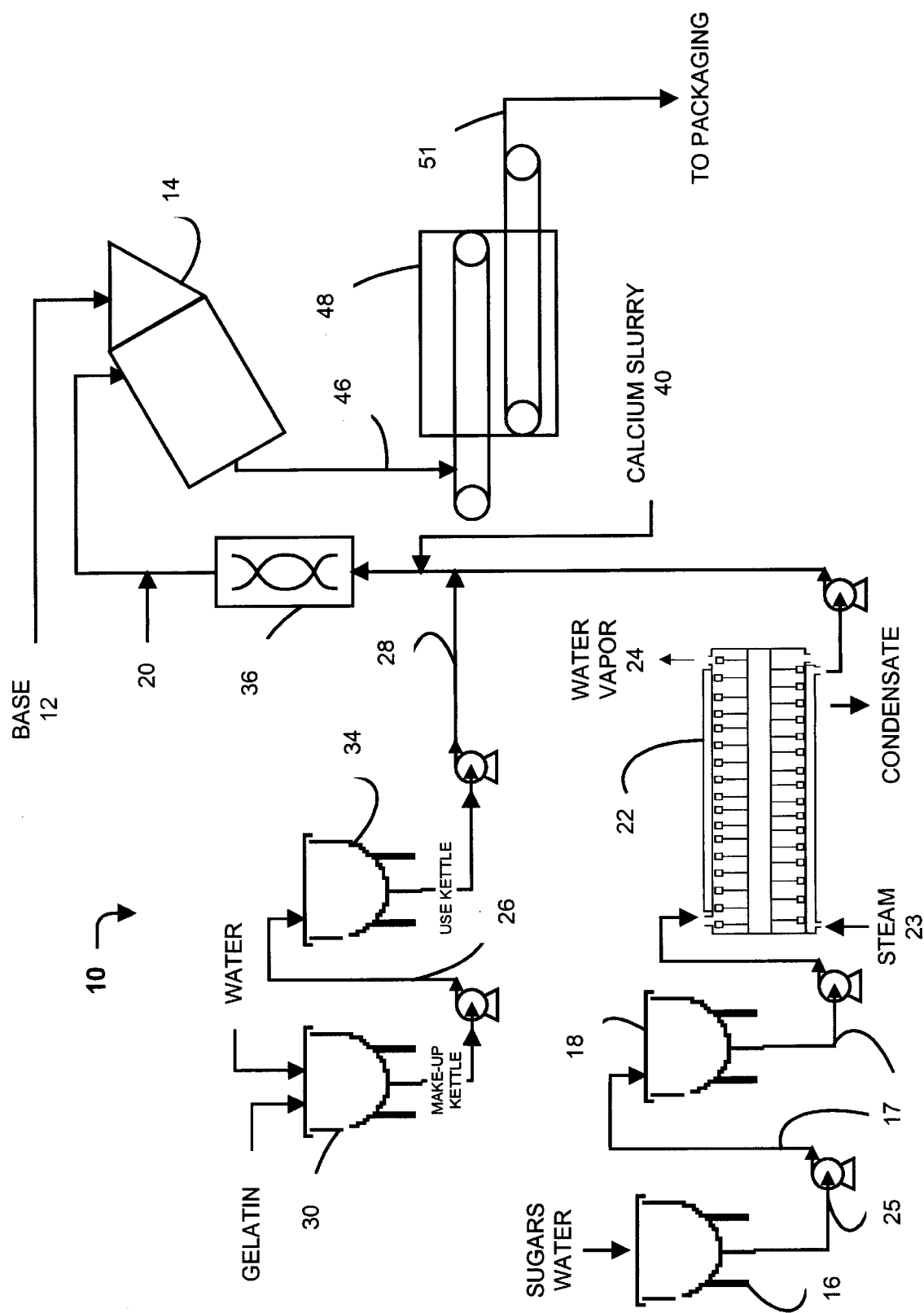

R-T-E CEREALS WITH CALCIUM CONTAINING PRE-SWEETENER COATING AND METHOD OF PREPARATION

BACKGROUND OF THE INVENTION

1. Field of the Invention

The present invention relates to food products and, more particularly, to presweetened ready-to-eat breakfast cereals. In its method aspect, the present invention relates to methods for the preparation of presweetened food products such as ready-to-eat cereals.

2. Description of the Prior Art

Cereal products, particularly ready-to-eat (hereinafter "R-T-E") breakfast cereals, are well-known and popular food items, particularly presweetened R-T-E cereals. Typically, such products include various coatings usually comprising nutritive carbohydrate sweeteners such as sucrose, corn syrup, fructose, etc. Also known are presweetened RTE cereals comprising coatings that include a high potency sweetener (See for example, U.S. Pat. No. 4,378,377, issued Mar. 29, 1983, entitled "Cereal Presweetened With Aspartame And Method Of Preparation", and U.S. Pat. No. 4,540,587, issued Sep. 10, 1985, entitled "Cereal Presweetened With Aspartame And Cold Water Soluble Gum Coating And Method Of Preparation", each to Gajewski).

Conventionally, presweetened breakfast cereals have been prepared by first producing unsweetened cereal pieces, particularly puffed cereal pieces; coating the cereal pieces with an aqueous slurry or solution of sweeteners; and then drying the coated pieces in an oven or air current to remove the added moisture.

One problem with sugar coated R-T-E cereals concerns the rate of dissolution in milk. Rapid sugar coating dissolution is considered by consumers to be negative. Rapid dissolution is perceived to be even more irksome for those sugar coated cereals having a frosted appearance as compared to those having a clear sugar coating. In the dissolution for frosted type sugar coated R-T-E cereals the change in visual appearance reinforces any taste perceptions.

It has been surprisingly discovered that inclusion of small amounts of gelatin into a pre-sweetener slurry provides improvements in reducing the rate of dissolution of the sugar coating in cold milk. Gelatin has been used in past R-T-E cereal coatings wherein a coating of a fondant type is provided. Gelatin has also been taught as useful as a binding or adhesive agent in sugar coating solutions to adhere large sugar crystals to R-T-E cereals equivalent to numerous other known binding agents. However, gelatin appears to be uniquely useful in providing the reduced rates of dissolution in milk in smooth sugar coatings for R-T-E cereals.

SUMMARY OF THE INVENTION

The present invention relates to methods for the preparation of sweetened food products and the products by such methods. The present invention is particularly suited for the preparation of R-T-E presweetened cereals.

In its product aspect, the present invention resides in comestibles or base, particularly R-T-E cereals, having a coating comprising gelatin. The coating is present in a weight ratio of base to coating ranging from about 100:5 to about 100:150. Gelatin is present in the coating at from about 0.5% to 4% of the coating.

In its method aspect, the present invention resides in methods essentially comprising in sequence the following steps. First, pieces of a dried cereal base are provided having a moisture content of less than about 5%. Thereafter, a pre-sweetener slurry that essentially includes gelatin is prepared and topically applied to the base. The weight ratio of cereal base to slurry mixture essentially ranges from 100:5 to about 100:150. The methods further include the step of drying the enrobed comestible to a final moisture content of less than about 5.0%.

DESCRIPTION OF THE DRAWINGS

The invention will be better understood by reference to the following drawings wherein:

FIG. 1 is a schematic process flow diagram of one preferred embodiment of the present method of preparation.

DETAILED DESCRIPTION OF THE INVENTION

The present invention relates to food products having a pre-sweetener coating essentially including gelatin and to methods of their preparation. The present methods have particular utility in the provision of presweetened R-T-E cereals. Reference is now made generally to FIG. 1, which shows a preferred embodiment of the present methods. Each of the preparation steps is described in detail below.

Throughout the specification and claims, percentages and ratios are by weight and temperatures given in degrees Fahrenheit, unless otherwise indicated.

A. Providing a Base of Dried Food Pieces

Referring now generally to the drawing, there is shown an embodiment of the present method of preparation generally designated by reference numeral 10. As there depicted, the present method 10 of preparation essentially comprise the step of providing 12 a base of dried food pieces which can be charged or fed to an enrober. The food pieces could be of any food type which is desired to be provided with a sweetened coating and include, for example, puffed popcorn or other grains, nuts, candies, and the like. The present methods find particular utility in providing R-T-E cereals with a presweetened coating. In the following detailed description of the present invention, even though particular reference is made to a base comprising R-T-E cereals, it is understood that the present invention also finds application in other food areas.

The cereal pieces or base can be of any geometric configuration or form including, for example, flakes or puffs, shreds, biscuits, mini biscuits or the like. The present invention finds particular utility in the coating of puffed cereals. Such cereal particles are prepared in the usual manner and may be either toasted or untoasted.

Any conventional puffed cereal or method of preparation can be used herein to provide a puffed cereal base. The art is replete with such compositions and their methods of preparation and the skilled artisan will have no problem selecting suitable compositions or methods of preparation. Exemplary compositions and methods of puffed cereal preparation are found in, for example, U.S. Pat. Nos. 3,464,827, (issued Sep. 2, 1969 to T. Tsuchiya, et al.); 3,600,193, (issued Aug. 17, 1971 to E. F. Glabel, et al.); 3,246,990, (issued Apr. 19, 1966 to Thompson, et al.); and 3,687,687, (issued Aug. 29, 1972 to A. L. Liepa), each of which is incorporated herein by reference.

Particularly useful herein are smooth puffed pieces such as puff base or "O" or ring shaped pieces. Such pieces can be fabricated from cooked cereal doughs containing oats, corn, wheat, rice, barley, and mixtures thereof and blends of such pieces. Minor cereal grains such as amaranth, triticale and the like are also known and can be used. The present invention finds particular suitability for use in connection with ring shaped puffed pieces fabricated from oat based cooked cereal doughs.

Prior to application of the pre-sweetener coating, the base pieces themselves typically will have density ranging from about 0.15 to 0.5 g/cc, preferably about 0.2 to 0.3 g/cc. Due to the various shapes and their packing factors, the bulk densities of quantities of the base prior to coating will range from about 0.1 to 0.25 g/cc.

For those food products requiring low moisture contents, it is important that any drying operation is performed prior to the coating of the pre-sweetener coating. Typically, for example, puffed cereal bases must be dried to relatively low moisture contents in order to have the desired crispness or frangibility. Thus, when a puffed cereal is the food base in the present methods of preparation, it is preferable to dry the puffed cereal base pieces to a moisture content of less than about 4%, and preferably less than about 3%, prior to the application of the pre-sweetener coating.

Any conventional drying technique can be used to reduce the moisture content of the cereal base pieces. The drying can be accomplished using equipment such as a rotary bed, tray, or belt dryers. Simple hot air convection drying, e.g., 200° F. to 280° F. (93.3° C. to 137.8° C.), is the preferred technique for practicing the present cereal piece drying. Of course, in certain applications, e.g., the provision of puffed cooked cereal dough pieces by direct expansion from a cooker extruder, the moisture content may be of suitable range without the need for a separate drying step.

B. Coating With A Pre-Sweetener Coating

In the present method of preparation, the next step in sequence is to coat or to enrobe the dried cereal pieces 12 with a pre-sweetener coating slurry containing gelatin 20. The slurry essentially comprises about 4 to 30% moisture, about 0.5–4% gelatin and the balance nutritive carbohydrate sweeteners.

Conveniently, this step can involve the sub-steps of (1) providing a sugar syrup; (2) admixing a hydrated gelatin or aqueous gelatin dispersion to the sugar syrup to form a presweetener coating blend; and, immediately thereafter, (3) applying the coating blend onto the cereal base.

(1) Providing A Sugar Syrup

The first substep can involve providing a sugar(s) syrup. The term "sugar syrup" is used in the art as a general collective term that includes both sugar syrups (i.e., no solids or oil components) as well as other compositions that include an oil component, whether or not emulsified, and/or solids. Generally, such sugar syrups comprise:

| Ingredient | Weight % | Preferred Range |
|---|---|---|
| Sucrose | 40 to 80% | 60 to 90% |
| Corn syrup | 0 to 30% | 10 to 20% |
| Oil | 0 to 25% | 0 to 5% |
| Moisture | 4 to 30% | 5 to 15% |

As illustrated, a first or make up kettle 16, can be used to prepare in batch fashion a sugar syrup.

Conveniently, this sugar syrup 17 is fed to a use kettle 18 that can supply a continuous stream of the sugar syrup 17 to a concentrator 22. The concentrator 22 is heated such as by steam 23 and in turn heats and concentrates the sugar syrup to by driving off water vapor 24 to provide a concentrated sugar syrup 25 of desired temperature, pressure and concentration. Also, the moisture concentration of the sugar syrup can be adjusted to anticipate the moisture added by the hydrated gelatin and/or other slurry additives to achieve desired moisture levels in the slurry upon application to the base.

In other variations, the provision of concentrated sugar syrup 25 can be practiced in a single vessel or in various equipment as desired.

(2) Admixing A Hydrated Gelatin

The substep of admixing a hydrated gelatin or aqueous dispersion of gelatin 26 can involve preparing a hydrated gelatin supply 28. A first make up kettle 30 can be used to prepare in batch fashion the hydrated gelatin 26 which is fed into gelatin use kettle 34 to supply a continuous stream of the hydrated gelatin 26.

The aqueous dispersion can contain about 10 to 35% gelatin, preferably about 15 to 30% gelatin and for best results about 20 to 30% gelatin. Gelatin can be supplied from various sources such as bovine (cow), porcine (pig), piscine (fish) and mixtures thereof. Preferred for use are high Bloom strength gelatins such as having a Bloom strength of over 200, preferably 250.

Surprisingly, gelatin appears to be unique in providing the resistance to dissolution in milk benefits of the present invention. Other hydrophilic colloids and gums that are in other food applications used as substitutes for gelatin surprisingly cannot be used in substitution for gelatin herein.

The hydrated gelatin can be kept warm but should be kept below the temperature at which gelatin begins to degrade. Good results are obtained when the hydrated gelatin is supplied at a temperature of below 180° F. (82.2° C.) and preferably at about 140 to 160° F. (60.00 to 71.1° C.).

The hydrated gelatin 26 can be added to the concentrated sugar syrup 25 and admixed such as with an in-line static mixer 36 to form the presweetener coating slurry 20 immediately prior to topically applying the slurry 20 to the base 12 in enrober 14. The residence time between the admixing can, in preferred embodiments range from 1 to 120 seconds. By minimizing the exposure times of the gelatin to the higher temperatures of the sugar syrup, excessive degradation or loss of the gelatin is reduced.

A variety of optional ingredients can be added to the pre-sweetener coating containing gelatin. Such optional ingredients can include flavors, colors, minerals, vitamins, preservatives, and supplemental high potency, oil, and mixtures thereof. If present, such ingredients can comprise about 0.1 to 15% of the coating composition. Heat tolerant high potency sweeteners can be used (e.g., acetylsulfame K). However, heat sensitive high potency sweeteners (e.g., aspartame) should not be used exclusively since the rigorous high temperatures of the subsequent drying step can cause degradation of these expensive high potency sweeteners. The vitamins selected should preferably be heat tolerant. A particularly useful combination of vitamins for topical application consist of vitamins C, A and D and mixtures thereof.

In preferred embodiments a "frosted" appearance for the sugar coating is desired as compared with a clear or glossy coating appearance. Manipulating the sugars content and crystal structure in known manner (i.e., adding crystalline sugar) can provide a frosted appearance. A frosted appearance can also be provided by adding, and in preferred embodiments, the coating composition additionally comprises, small amounts of titanium dioxide ($TiO_2$). Suitable $TiO_2$ concentrations range from about 0.02% to about 0.5% of the coating composition. Addition of a powdered white pigment is preferred to addition of a crystalline sugar or other sugar manipulation so as to provide not only a pleasing initial frosted appearance but also the benefits of resistance to dissolution in milk. Indeed, in highly preferred variations, addition of crystalline sugar to the enrober is avoided during the coating step.

In certain embodiments, it is desirable to provide calcium fortification, especially for R-T-E cereal products intended for principle use by children. Calcium fortification can be provided in whole or in part by adding calcium materials to the cooked cereal dough from which the base pieces are fabricated. In other embodiments, the calcium fortification is provided in whole or in part by adding calcium materials 40 to the pre-sweetener coating composition or as part of the enrobing step (e.g., adding powdered calcium materials along with the pre-sweetener coating).

In addition to the nutritional benefits provided by employment of calcium materials, a supplemental appearance benefit is also provided especially for frosted coatings. Thus, rather than relying upon sugar crystal size and composition for imparting a frosted appearance, the appearance results from employing $TiO_2$ or calcium materials or both.

Good results are obtained when the present confectionery compositions comprise sufficient amounts of calcium ingredients to provide the total calcium content of the coated food base to from about 50 to 1500 mg per 28.4 g (1 oz) serving (dry basis) (i.e., about 0.15 to 5.5% by weight, dry basis).

Useful herein to supply the desired calcium levels are calcium ingredients that supply at least 20% calcium. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone has trace metal concentrations of less than 10 PPM. In particular, ground limestone having a particle size of less than 5 microns is preferred for use herein.

Also useful herein are insoluble mineral calcium salts, particularly calcium phosphate salts. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic $(CaH_4(PO_4)_2.H_2O)$, dibasic $(CaHPO_4.2H_2O)$ or tribasic $(Ca_3(PO_4)_2)$ salts. Preferred for use herein is tricalcium phosphate, $Ca_3(PO_4)_2$, ("TCP") because of its high weight percentage of calcium (about 38%).

In still other variations, a variety of fine particulates can be added during the coating step. For example small candy pieces especially brightly colored or sprinkles can be added to decorate the R-T-E cereal surface. In like variations, small bits of fruit (e.g., apple cranberry, blueberry, and apricot) or other cereal grains, e.g., oat flake bits can be added to provide flavor or visual appeal.

In still other variations, a fiber can be added. Of particular interest is inulin in view of its bland flavor and solubility. In preferred variations, inulin is added in partial substitution for the sugars. If present, inulin can comprise from about 0.1 to 15% of the coating composition, preferably about 5 to 15%. If desired, other frustooligosaccharides ("FOS") can be used in full or partial substitution for inulin, especially short chain FOS ("scFOS").

(3) Applying The Coating Blend Onto The Cereal Base

The pre-sweetener coating-containing gelatin is then applied to the pieces of the cereal base to form a coated base 46. Desirably, the weight ratio of cereal base pre-sweetener coating containing gelatin ranges from about 100:5 to 100:150, and preferably from about 1:30 to 1:120.

In the present process, the pre-sweetener coating containing gelatin can be applied to the cereal pieces, for example, using an enrober drum while the pre-sweetener coating containing gelatin is at an elevated temperature and thus fluid. The pre-sweetener coating-containing gelatin may be at a temperature of between about 212° F. to 300° F., and preferably between 220° F. and 260° F.

The solution should preferably be introduced as a fine spray; nozzles having the desired spray producing characteristics are commercially available and will not be described in detail.

Any conventional enrobing apparatus and technique can be used to practice the present enrobing or application step. Generally, a useful technique involves tumbling. The comestible piece(s) and aqueous suspension are each charged in any order to a rotating drum and tumbled for a sufficient time to achieve an even distribution of the suspension on the comestible. Preferably, the aqueous suspension is added after the comestible has been added to the drum. Another useful technique is simply spraying the aqueous solution over those comestibles, which are desirably not tumbled due to the shape, frangibility, etc.

In another variation, particulate matter can be added to the enrober for adhering the particulate matter to the external surface of the R-T-E cereal pieces. Particulate matter can include fruit pieces, granola, seed bits, candy bits, bran and mixtures thereof. The particulate material upon finish drying of the R-T-E cereal adheres to the external surface due to the coating action of the sugar slurry. Particulate matter can be added in a weight ratio of particulate matter to cereal base ranging from about 1:100 to about 25:100, preferably about 5:100 to about 15:100.

C. Drying

Desirably, the finished cereal base coated with the pre-sweetener coating is at moisture contents ranging from about 3 to 5% to provide shelf stable storage. Conventionally, the base 46 having been coated with a pre-sweetener coating is subjected to a drying step, and the present methods can comprise such drying step, in a drier 48 for times sufficient to reduce the moisture content to such desirable levels. The drying step functions to remove the moisture added with the pre-sweetener coating.

In certain embodiments, however, the pre-sweetener coating can be at sufficiently low moisture content (i.e., under 5% moisture) such that post coating application drying is minimal or even unnecessary.

The finished product 51 is characterized by a thin (i.e., about 20 to 40 microns in thickness) sugar coating containing gelatin. In those preferred embodiments containing $TiO_2$, calcium materials, and mixtures thereof, the finished product is further characterized by a desirable white appearance. Presweetened R-T-E cereals having the sugar coating thereon exhibit surprising resistance to dissolution of the coating in milk.

If desired, the dried R-T-E cereal pieces can be thereafter fortified with an exterior or topical application of heat sensitive vitamins. A vitamin(s) dispersion is topically added to the cereal base 51 such as by tumbling 54 to form a vitamin fortified finished presweetened R-T-E cereal. Of course, the topical application of beta carotene is less preferred for the stability and appearance concerns discussed herein. Vitamin C beta carotene and other heat labile vitamins can optionally be sprayed onto the cereal pieces after the drying step 30.

After finish drying, the sugar coated pieces 51, optionally vitamin fortified, are allowed to cool to ambient temperature and then subsequently packaged and distributed in conventional manner. No further drying is required since the amount of added moisture from topical vitamin application is small.

What claimed is:

1. A process for preparing a presweetened food product, comprising the steps of:
   (a) providing pieces of dried base;
   (b) coating the dried base pieces with a pre-sweetener coating comprising about 4 to 30% moisture, about 0.5 to 4% gelatin, a calcium material in amounts sufficient to provide coated pieces with a calcium content ranging from about 0.15 to 5.5% by weight dry basis and the balance nutritive carbohydrate sweeteners wherein the weight ratio of dried base pieces to coating ranges from about 100:5 to 100:150 to form the coated pieces;
   (c) reducing the moisture content of the coated pieces to a range of less than 5%.

2. The process of claim 1 wherein at least a portion of the dried base includes a R-T-E cereal.

3. The process of claim 2 wherein the coating additionally comprises $TiO_2$.

4. The process of claim 3 wherein step B comprises the sub-steps of:
   (1) providing a sugar syrup;
   (2) admixing a hydrated gelatin with the sugar syrup to form a coating; and immediately thereafter,
   (3) applying the coating onto the base.

5. The process of claim 4 wherein the hydrated gelatin comprises about 20 to 30% gelatin.

6. The process of claim 5 wherein the sugar syrup has a moisture content of about 4 to 15%.

7. The process of claim 5 wherein the gelatin has a Bloom strength of at least 200.

8. The process of claim 1 wherein the calcium material is ground limestone having a particle size of less than 5 microns.

9. The product prepared by the process of claim 1.

10. The product prepared by the process of claim 2.

11. The product prepared by the process of claim 3.

12. The product prepared by the process of claim 4.

13. The product prepared by the process of claim 8.

14. A sweetened dry comestible, comprising:
   from about 5 to 60% of the comestible of a coating, said coating including from about 0.5 to 5% of gelatin, a calcium material in amounts sufficient to provide a calcium content ranging from about 0.15 to 5.5% by weight, dry basis, and the balance nutritive carbohydrate sweeteners.

15. The comestible of claim 14 wherein the comestible is a R-T-E cereal particle.

16. The comestible of claim 15 wherein the coating additionally comprises $TiO_2$.

17. The comestible of claim 14 wherein the calcium material is ground limestone having a particle size of less than 5 microns.

18. The comestible of claim 17 wherein the coating has a thickness in the range of about 20 to 40 microns.

* * * * *